United States Patent [19]

Sisk

[11] Patent Number: 5,360,030
[45] Date of Patent: Nov. 1, 1994

[54] BUTTERFLY VALVE INCORPORATING SLEEVE SEALS

[76] Inventor: David E. Sisk, Rte. 1, Box 246 E, Bonne Terre, Mo. 63628

[21] Appl. No.: 136,093

[22] Filed: Oct. 14, 1993

[51] Int. Cl.$^5$ .............................................. F16L 7/00
[52] U.S. Cl. .................................... 137/375; 251/306; 251/308
[58] Field of Search ................ 137/375; 251/305, 306, 251/308

[56] References Cited

U.S. PATENT DOCUMENTS

| | | | |
|---|---|---|---|
| 3,100,500 | 8/1963 | Stillwagon | 137/375 |
| 3,334,650 | 8/1967 | Lowrey et al. | 137/375 |
| 3,778,028 | 12/1973 | Graves et al. | 137/375 |
| 3,904,173 | 9/1975 | Naylor | 137/375 |

FOREIGN PATENT DOCUMENTS 2315046  2/1977  France ............................ 137/375

*Primary Examiner*—A. Michael Chambers
*Attorney, Agent, or Firm*—Paul M. Denk

[57] ABSTRACT

An industrial butterfly valve which incorporates a disc valve mounted upon a valve stem, the butterfly valve having a tubular housing, with a gasket lining the interior passageway through the housing, the gasket and tubular housing having apertures provided therethrough for pivotally mounting of the valve stem and its disc element, and a sleeve provided upon the valve stem and lining the gasket apertures to prevent leakage of any fluid material therethrough or from contacting and deteriorating the contiguous gasket.

3 Claims, 3 Drawing Sheets

BUTTERFLY VALVE INCORPORATING SLEEVE SEALS

BACKGROUND OF THE INVENTION

This invention relates generally to a butterfly valve for application within a fluid flow passageway, and more particularly, to a lapping sleeve device for protecting the valve disc element and its pivot stem from corrosion.

Butterfly valves are frequently used in fluid flow lines where it is desired to load or unload fluid materials for shipment or storage. Such uses include tank trailers for transporting fluids from one location to another, as well as fluid flow lines for loading and unloading tank trailers, barges, ships or other means of transportation and storage. The typical butterfly valve customarily uses a pivotally mounted disc-type valve in a flow line which also incorporates a resilient seal against which the disc valve pivots to seal off the flow line, and when opened, to allow fluid materials to be conveyed along the flow line. Examples of butterfly valves are included in my prior U.S. Pat. No. 4,822,001.

The substances transported in tanks using butterfly valves are often caustic or acidic. When these caustic materials enter the valve pivot stem pivot apertures, they can corrode the valve seat and pivot stem. This corrosion diminishes the effectiveness of the resilient seal within the valve causing leakage. Several attempts have been made in the prior art to manufacture butterfly valves that resist corrosion. For example, the inner wall of the flow chamber is sometimes protected with a chemically resistant material. Although this protects a portion of the stem hole or aperture and resist corrosion, the pivot stem and disc element pivot seat areas are still exposed to the caustic or acidic materials which leads to corrosion and an ineffective valve.

SUMMARY OF THE INVENTION

Among the several objects and advantages of the present invention include:

The provision of a lapping sleeve device in a butterfly valve which prevents corrosion of the pivot stem;

she provision of a lapping device that forms a sleeve in a butterfly valve which prevents corrosion of the disc element seats;

The provision of a sleeve formed device in a butterfly valve which eliminates the direct exposure of the rubber or other material gasket or backing in the aperture lining of the pivot stem;

The provision of a lapping sleeve device in a butterfly valve which, in cooperation with O-rings, eliminates the direct exposure of metal on the pivot stem to any corrosive materials carried by the tank trailers; and The provision of a sleeve formed device in a butterfly valve which is inexpensive and simple to manufacture and well suited for its intended purpose.

These and other objects will become more apparent to those skilled in the art in light of the following description and accompanying drawings.

Briefly stated, the invention contemplates a butterfly valve that includes a disc valve pivotally mounted within a tubular housing through which material flows. The tubular housing has a flow chamber provided approximately centrally through the housing. The butterfly valve is generally located between spaced flanges provided within a material flow line. The flow line has a passageway therethrough through which material flows and passes through the flow chamber of the tubular housing. The butterfly valve has a pivot stem supporting the disc foe its pivotal movement between the open and closed positions. The pivot stem pivot mounts in apertures arranged diametrically of and within the tubular housing. The pivot stem mounts for furnishing the pivotal movement of the stem and disc valve.

The improvement therein comprises a lapping sleeve like device for lining an aperture from an inner wall of the flow chamber to an outer wall of the tubular housing. The lapping device comprises a tubular sleeve like formed body integrally connected with a gasket of the valve. The body includes a top shoulder portion adapted to lie in general co-planar relationship with the outer wall of the tubular gasket. A first sleeve portion extends downwardly and inwardly from the top portion. This sleeve portion is sized for snug contact with the outer surface of the valve stem. A tubular wall portion integrally connects and extends outwardly and downwardly from the sleeve portion. Said tubular wall portion integrally connects and extends outwardly from the sleeve portion. The entire .sleeve like device is sized to overlap with the gasket liners that define the pivot apertures. The disc element includes a disc element seal which integrally connects to the disc element and extends a predetermined distance along the pivot stem. The sleeve and other coatings and liners defined herein are generally formed of Teflon, otherwise identified as polytetrafluorethylene.

DESCRIPTION OF THE PREFERRED EMBODIMENT

Figure 1:
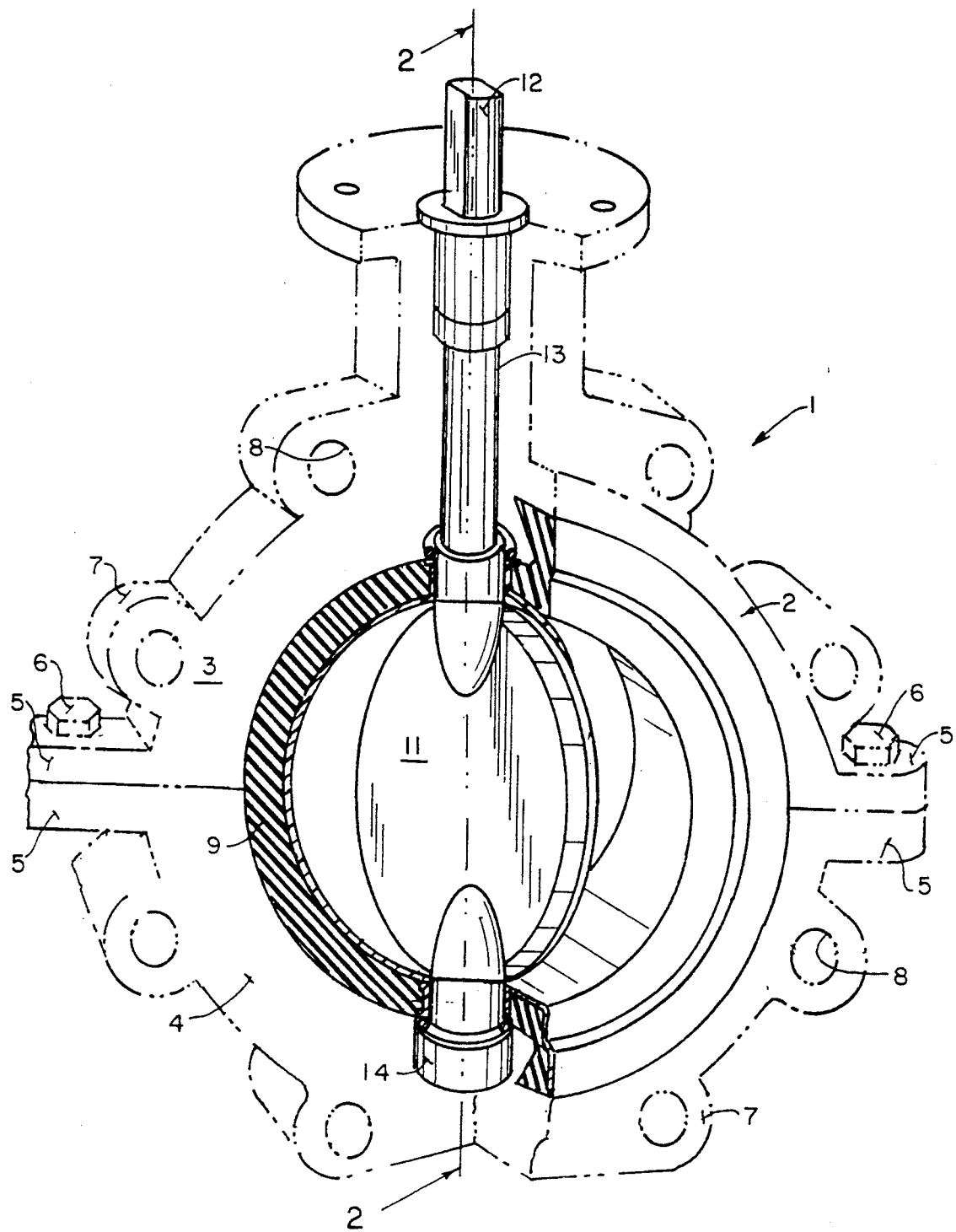
FIG. 1 is a partial sectional view in perspective of a butterfly valve which incorporates a lapping sleeve device of the present invention.

In referring to drawings, and particular FIG. 1, the butterfly valve 1 of this invention is disclosed. As shown, the butterfly valve is designed for locating within a flow line, or pipe system, particularly one that may be used in the trucking industry, or with respect to the shipping industry in general, where valve means are required for preventing the flow of liquids, or other flowable materials, such as granular materials, through its closure, but may be manipulated into an opened conditions, to allow for the free flow of the same. Normally, for example, these types of valves are used in the outlet line from a tank trailer, to retain its contents within the vehicle, as during shipment, but that when it arrives at its destination, and its piping system is connected to its site of usage, the valve may then be opened to allow for the free flow of its contents.

As disclosed, normally, such butterfly valves are constructed of a tubular housing, as at 2, and which housing may be fabricated of semi-cylindrical portions, such as disclosed at 3 and 4, and which integrally incorporate a pair of mating flanges, at 5, secured together by means of a fastening means, such as the bolts 6, as shown. Furthermore, the tubular housing may include a series of integral mounts, as at 7, which incorporate apertures 8 therethrough, to facilitate the innerconnection of the butterfly valve into the pipe line, and securement to the pipe flanges (not shown), when mounted into operative position.

As is also known in the art, a gasket 9 normally mounts upon the inner surface of the tubular housing 2, extending entirely around its inner perimeter, and which is designed to provide for a slight cushioning to facilitate the sealed closure of the valve, when manipulated into that condition. See also FIG. 2. The gasket 9 normally secures onto the dove tail extensions of the tubular housing, as disclosed at 10. As is also known in the art, a disc for the butterfly valve, as shown at 11, secures upon a stem 12, which stem is designed for inserting through a pair of aligned and diametrically arranged apertures, as at 13 and 14, to assure the securement of the butterfly valve into its operative position, allow for hermetic sealing of the disc 11 at its outer peripheral edges within the gasket 9, when aligned into closure. As can be seen in FIG. 1, the disc 11 of the butterfly valve has been pivoted 90°, into its opened position. On the other hand, as disclosed in FIG. 2, the disc 11 has been pivoted back into closure, and is aligned within the gasket 9, to provide for its sealed closure. As can also be noted, the gasket 9 has a Teflon liner 15 molded upon the inner surface of said gasket, and cooperates with the Teflon coating applied to the disc 11, to assure tight sealing of the disc within the tubular housing, when complete closure of the butterfly valve is required.

Figures 2, 3, 4:
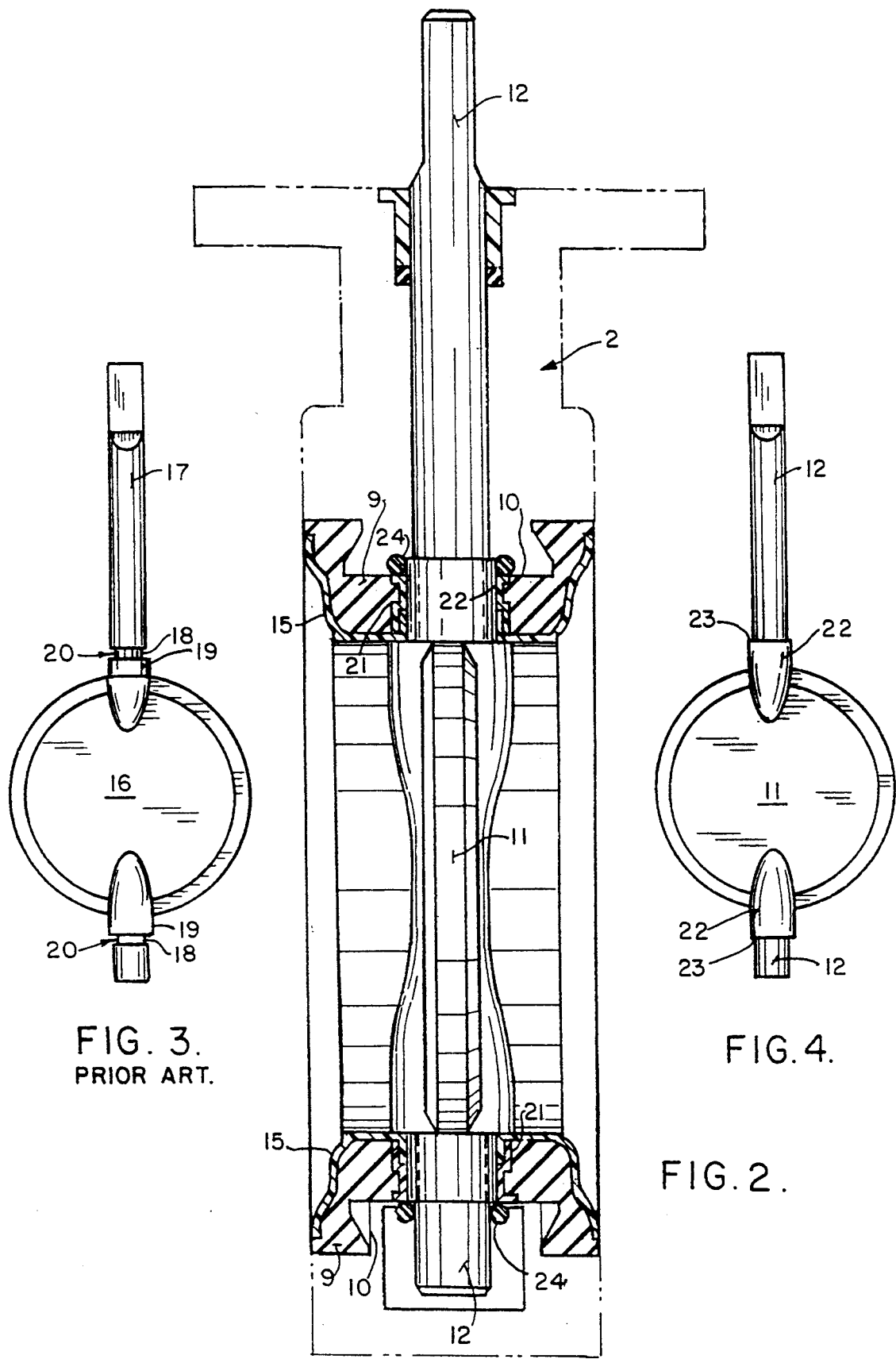
FIG. 2 is a sectional view taken along line 2—2 of FIG. 1.
FIG. 3 is an elevational view of a pivot stem and a disc element of the prior art.
FIG. 4 is an elevational view of a pivot stem and a disc element of the present invention.

One condition for this current invention is to provide for remedying of deficiencies that prevailed in prior art type of butterfly valves. For example, as can be seen in FIG. 3, where the disc 16 for a butterfly valve had previously been prepared and coated with a Teflon material, in its formation upon the valve stem 17, as shown herein, normally such valve stems have a recessed portion, as disclosed at 18, and when the disc 16 is coated with its Teflon material, in addition to its extension portion 19, when the Teflon sets, it has a tendency to shrink, leaving substantial gaps, as shown at 20, provided at either side of the fabricated disc. This is undesirable, since frequently when the butterfly valve is located into an operative position, when installed within a flow line, and should any caustic or acidic material or fluids be stored within the tank trailer, as the butterfly valve is manipulated between opened and closed conditions, frequently such fluids have a tendency to migrate or permeate through the tight condition that should prevail in the mounting of the disc within its valve housing, and such caustic solution, when it migrates to these areas, such as shown at said 20, has a tendency to form corrosion upon the stem of the valve, can cause deterioration of any contiguous surfaces of the gasket 9, that rubs against the Teflon extensions 19, or thereabove, and generally, over a period of time, leads to undesirable and unacceptable leakage, even when the valve is closed, which is just intolerable, and would not be approved by regulations. These deficiencies have been previously summarized.

As can be seen from the current invention, as also disclosed in FIGS. 2 and 4, this current invention includes the addition of a particularly configured sleeve 21 to the inner surface of the aperture that is provided through the gasket 9, and through which the stem 12 locates, and this particular sleeve 21 is fabricated also of Teflon material, with its upper surface pivotally engaging snuggly against the Teflon extension 22 that extends upwardly and downwardly from the disc 11, so as to assure that there is a Teflon-upon-Teflon contact between these pivotable movable components, at this location, so as to assure that any contained liquids or flowable materials, within the tank trailer, will be sealed within the flow line, and not permeate out through the valve stem, and little or no deterioration can result, since the caustic solution never attains access to either the metallic portions of the stem 12, or contact the formed gasket 9. Furthermore, as can be seen in FIG. 4, when the Teflon material is coated upon the disc 11 of the butterfly valve, it is coated sufficiently upwardly and downwardly along the stem 12, so as to abut against the stem shoulder, as at 23, to assure that there is constantly a contact between the Teflon sleeve 21, and the reduced portions of the stem, as at 18, as previously explained, and which tended to cause the deficiency in the prior art valve structures. Furthermore, when the valve stem and butterfly valve is assembled, O-rings, such as at 24, are secured into position, by means of the tubular housing, to compress against the outward extending flanged edges of the Teflon sleeve 21, and likewise against the outer surfaces of the integral Teflon extensions 22 of disc 11, to assure that there can be no fluid leakage at this position, entirely around the outer circumference of the valve, at this peripheral position. Also, said flanged edges act as a seat for the said O-rings 24.

Figure 5:
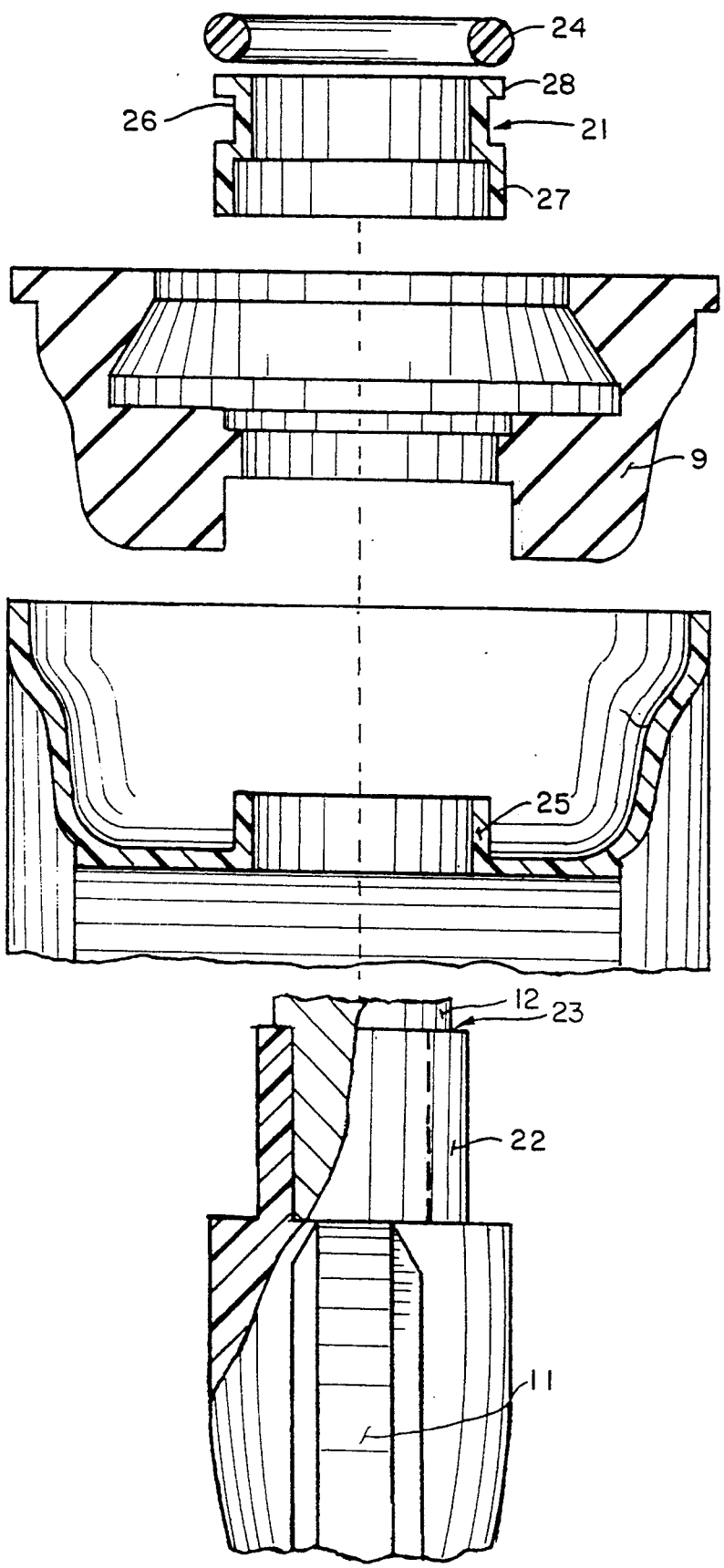
FIG. 5 is an exploded view of the lapping sleeve device, of this invention for mounting within a lined gasket.

As can be seen more clearly in FIG. 5, which is an exploded view of the upper segment of the disc 11, as previously shown and described in FIG. 2, it can be seen that when the Teflon coating is applied to the disc 11, its extensions, as at 22, as provided upon the valve stem 12, extend all the way up to its shoulder area, as at 23, as previously explained. Then, when the valve stem inserts through the aperture provided through the gasket liner 15, there is an initial sealing contact between the liner extension, as at 25, and the outer surface of the disc extension 22. Also, when the gasket 9 is positioned upon the valve stem, which actually is done simultaneously since the liner 15 is coated or molded onto the gasket 9, the extensions 25 provide a shielding of the rubber or other polymeric surface of the gasket, at that position, from contact with any caustic or acidic solution that may be transported within the tank trailer. Then, as the disc 11 of the valve extends upwardly through the gasket, its Teflon coated extensions 22 further shield the gasket from contact with any such solution. But, to assure complete isolation, the particularly configured sleeve 21 is provided, and it includes an upper reduced diameter area 26, that integrally extends downwardly into a flared tubular portion 27, with the reduced portion 26 snuggly and contiguously contacting the surface of the disc extension 22, to prevent the escape of any fluids therethrough, while the lower expanded diameter area 27 overlaps the gasket liner area 25, so as to prevent the leakage of any materials there around. The upper edge of the sleeve 21 has the said outwardly flaring flange, as at 28, and against which the O-ring 24 mounts, when the valve is assembled. A similar type of flaring sleeve 21 is also provided at the bottom of the disc, as can be seen in FIG. 2, for sealed mounting of the lower portion of the stem 12 within its pivot mount.

Thus, when constructed in this manner, it has been determined and found that fluid leakage is curtailed, that none of any of the caustic or acidic solutions that are being transported will leak out of these hermetically sealed areas, as a result of the additions of the sleeves 21 within the gasket assembly, and since the extensions 22 not only extend fully and abut up against the shoulders of the stem 12, there is always a Teflon-upon-Teflon seal formed within the entire disc pivot assembly, to assure hermetic sealing thereat, and prevent fluid leakage, and the resultant deterioration that has heretofore damaged the industry.

Variations or modifications to the subject matter of this invention may occur to those skilled in the art upon reviewing the disclosure provided herein. Such variations, if within the spirit of this invention, are intended to be encompassed within the scope of any claims to patent protection issuing upon this development. The disclosure as provided herein is done so for illustrative purposes only.

Having thus described the invention, what is claimed and desired to be secured by Letters Patent is:

1. An industrial butterfly valve of the type including a disc valve pivotally mounted within a tubular housing through which material flows, said tubular housing having a flow chamber provided approximately centrally therethrough, said butterfly valve being located between spaced flanges provided within a material flow line, said flow line having a passageway therethrough and through which material flows as it also passes through the flow chamber of the tubular housing, said butterfly valve incorporating a pivot stem supporting said disc valve for its pivotal movement between the opened and closed positions, and pivot mounts in the form of apertures arranged diametrically of and within said tubular housing to mount for pivotal movement of the stem and disc valve, a gasket means provided within said tubular housing, said gasket having a liner formed thereon to isolate the gasket from the material flowing through the flow chamber, said liner having integral extensions extending diametrically away from each other and into the apertures forming the pivot mounts within the tubular housing, said stem extending from opposite edges of the disc valve and pivotally mounting through said housing, gasket means, and the extensions of its liner within the disposed apertures, the improvement comprising a sleeve device for lining the apertures from an inner surface of the flow chamber to an outer surface of the gasket means and said adjacent stem, thereby precluding any material flowing through the flow line from leaking proximate the valve stem and contacting the gasket means and said adjacent stem, said disc element being lined with a chemically resistant material, and said material extending a distance radially outwardly upon the stem supporting the disc element, said sleeve device also formed of chemically resistant material and mounting upon each valve stem and being in contact with the extended portions of the liner material upon the disc stem, and lapping the liner extensions provided upon the gasket liner, so as to prevent leakage of conveyed fluid material therethrough, and to separate the material flowing through the flow chamber from contacting the butterfly valve, its pivot stems, the gasket, and the tubular housing through which the material flows, each sleeve having a reduced diameter portion for contiguously mounting upon the pivotal stem and the stem therein, and said sleeve including an integrally enlarged diameter portion nearer the disc valve for contiguously lap mounting upon the proximate gasket liner extensions, each valve stem having an integrally formed shoulder provided a spaced distance from its mounted disc element, and the liner material coating the disc element extending outwardly upon said valve stem and to its formed integral shoulders, and the extended liner portions provided upon the disc and radially outwardly upon its stem extending outwardly of the gasket means through which the valve stem extends.

2. The invention of claim 1 and including O-rings provided upon the liner material of the valve stems and compressing against the outer edge of each sleeve device to provide a seal at said location to prevent the flow of material passing through the flow chamber from accessing therethrough.

3. The invention of claim 2 wherein a flange formed at the outer edge of each said sleeve device and functioning as a seat for the contiguous O-ring sealingly mounting upon each disc stem.

* * * * *